United States Patent [19]

Hashimoto

[11] Patent Number: 4,922,523
[45] Date of Patent: May 1, 1990

[54] VIDEOTEX WITH TELEPHONE CALL SCREENING SYSTEM

[75] Inventor: Kazuo Hashimoto, Tokyo, Japan

[73] Assignee: Hashimoto Corporation, Tokyo, Japan

[21] Appl. No.: 396,721

[22] Filed: Aug. 7, 1989

Related U.S. Application Data

[63] Continuation of Ser. No. 129,938, Dec. 3, 1987, abandoned, which is a continuation of Ser. No. 815,072, Dec. 30, 1985, abandoned.

[30] Foreign Application Priority Data

Dec. 29, 1984 [JP] Japan .................................. 59-276744

[51] Int. Cl.⁵ .......................................... H04M 11/00
[52] U.S. Cl. ........................................ 379/96; 379/215
[58] Field of Search ..................... 379/93, 94, 96, 215, 379/97, 98; 358/85

[56] References Cited

U.S. PATENT DOCUMENTS

| | | | |
|---|---|---|---|
| 3,502,812 | 3/1970 | Litofsky . | |
| 3,626,107 | 12/1971 | Armstrong et al. | 379/215 X |
| 3,746,793 | 7/1973 | Sachs et al. . | |
| 4,150,254 | 4/1979 | Schussler et al. | 379/96 |
| 4,289,930 | 9/1981 | Connolly et al. | 379/96 X |
| 4,387,271 | 6/1983 | Artom | 358/85 X |
| 4,388,489 | 6/1983 | Wigan et al. | 358/85 X |
| 4,392,022 | 7/1983 | Carlson | 358/85 X |
| 4,397,030 | 8/1983 | Becker et al. . | |
| 4,427,847 | 1/1984 | Hofmann et al. | 358/85 X |
| 4,533,943 | 8/1985 | Poirier | 358/85 |
| 4,649,533 | 3/1987 | Chorley et al. | 379/94 X |
| 4,852,151 | 7/1989 | Dittakavi et al. | 379/97 |

FOREIGN PATENT DOCUMENTS

| | | | |
|---|---|---|---|
| 3039949 | 5/1982 | Fed. Rep. of Germany | 379/94 |
| 3315884 | 11/1984 | Fed. Rep. of Germany | 379/94 |
| 3331947 | 3/1985 | Fed. Rep. of Germany | 379/93 |
| 59-36470 | 2/1984 | Japan | 379/94 |
| 0036470 | 2/1984 | Japan | 379/94 |
| 2169172 | 7/1986 | United Kingdom | 379/94 |

Primary Examiner—Keith E. George
Attorney, Agent, or Firm—Lowe, Price, LeBlanc, Becker & Shur

[57] ABSTRACT

If a call waiting signal is supplied to a telephone line during reception of a videotex information through a videotex center, a control unit responds to the calling signal to actuate call waiting equipment and an associated switching unit for transmitting the calling signal to a videotex line and displaying an alarm signal at the videotex receiver. When the user of the videotex changes over the switches of the switch box and places his telephone receiver off-hook, he can communicate with the incoming calling party.

2 Claims, 1 Drawing Sheet

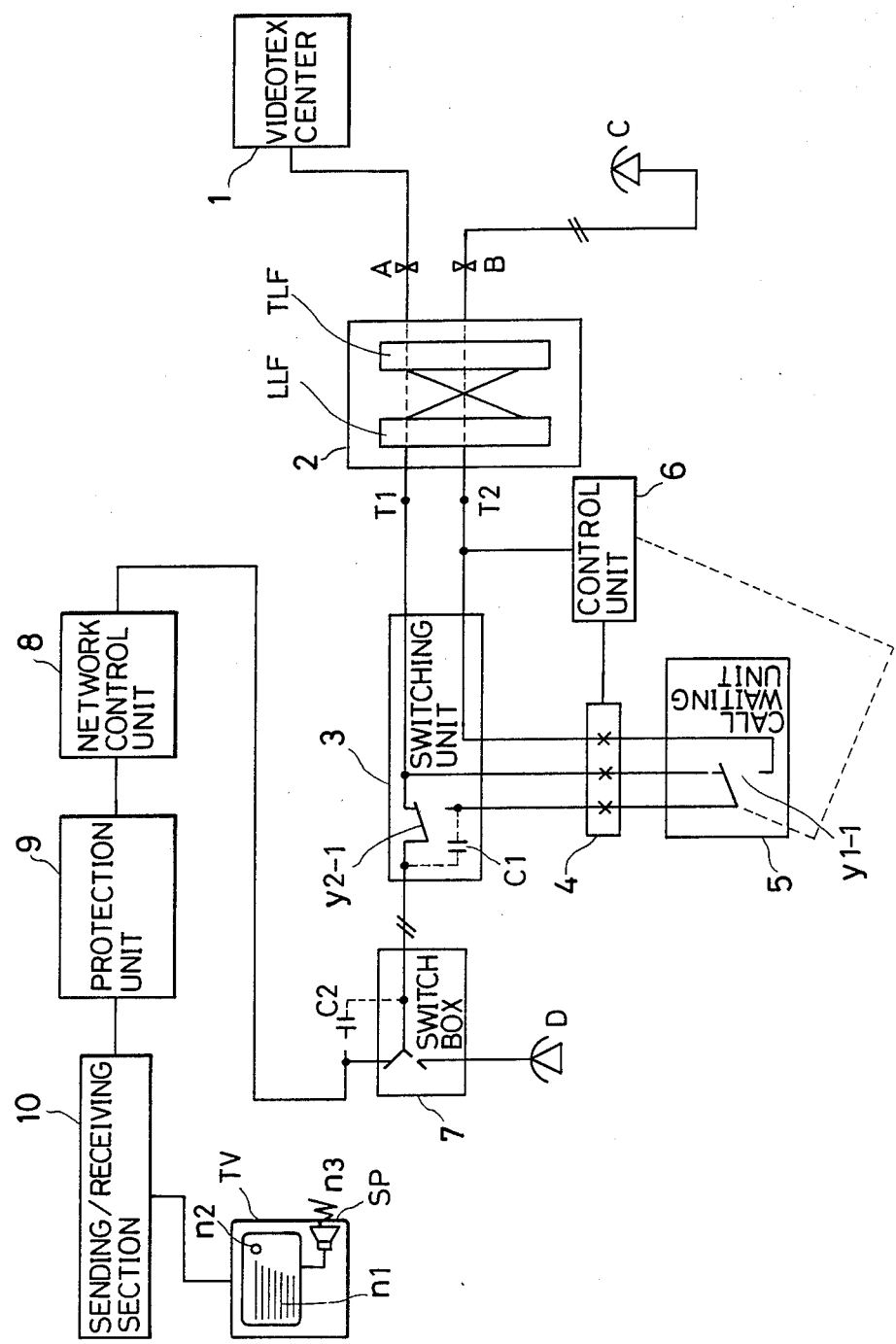

VIDEOTEX WITH TELEPHONE CALL SCREENING SYSTEM

This application is a continuation of application Ser. No. 07/129,938, filed Dec. 3, 1987, which is a continuation of application Ser. No. 06/815,072, filed Dec. 30, 1985 (both now abandoned).

BACKGROUND OF THE INVENTION

The present invention relates to a telephone call screening system to be incorporated with videotex.

In a conventional videotex system, when a subscriber calls a videotex system center by the associated telephone set and depresses a manual operation button of the videotex switch box upon reception of an answer back signal from the center, the telephone set is disengaged from the telephone line and cannot be used for telephonic conversation. While in this state, when an incoming telephone call comes in, the user is not aware of it because the telephone set does not ring. Therefore, the user cannot allocate sufficient time to the use of the videotex system, particularly during business hours, when there is risk of missing an important telephone call.

SUMMARY OF THE INVENTION

The present invention solves the above described disadvantages of the conventional videotex system. It is a first object of the present invention to produce, during use of a videotex, an alarm signal on the display of the videotex, hereinafter referred to as a VDT (videotex display terminal), to indicate the reception of an incoming telephone call, so that the user can be aware of the incoming call.

It is a second object of the present invention to enable a user of the videotex who is a subscriber to call waiting service to switch the telephone line from the videotex to the telephone set by momentarily placing a hook switch on the telephone set on-hook upon notification of an incoming call from an external line. The user can thereby communicate with the calling party, and then switch the line from the telephone set back to the videotex by operating the hook switch a second time.

According to the present invention, a telephone call screening system is incorporated with the videotex, such that while videotex information is being transmitted between a videotex center and a VDT over a first telephone line A through a sending/receiving unit, a protection unit, a network control unit, the switch box, a switching unit and, a telephone exchange, if a telephone call comes in via a second telephone line B, the calling signal operates the control unit so as to operate a call waiting unit. The occurrence of the calling signal is indicated on the VDT as an alarm signal through the switching unit, the switch box, the network control unit, the protection unit, and the transmitting/receiving unit, making the subscriber aware of the incoming telephone call. The subscriber then changes over the switch box and places the subscriber telephone set D off-hook, thereby permitting conversation between the outside calling party's telephone set C and the subscriber telephone set D.

The advantages of the present invention are as follows: According to the present invention, a conventional videotex is combined with a call waiting service, with a special means added thereto. With this special means, even during use of the videotex, the user can respond to an incoming call by simple manual switching and momentarily depressing the telephone hook switch. As a result, the application and use-time of the videotex is greatly increased, resulting in great practical advantages.

BRIEF DESCRIPTION OF THE DRAWING

The accompanying drawing is a diagram showing a telephone answering system according to an embodiment of the present invention.

DETAILED DESCRIPTION OF THE PREFERRED EMBODIMENT

The structure and function of an embodiment of the present invention will be described with reference to the drawing.

In the drawing, reference symbol A denotes a telephone line A connected to a videotex center 1; B, another telephone line for receiving an incoming call from a general calling party's external telephone set C; 2, a central telephone exchange; TLF, a trunk link frame; and LLF, a line link frame. The line link frame LLF consists of two circuits having terminals T1 and T2. The terminals T1 and T2, together with PBX relay, constitute two circuits for the pilot number service. The line link frame LLF incorporates these two circuits.

The terminal T1 is used for videotex line terminal and the terminal T2 is incoming trunk terminal and preferably used exclusively for receiving an incoming telephone call. Reference numeral 3 denotes a switching circuit (SWU) with relay contact arranged therein; 4, a terminal box; 6, a control unit; and 5, a call waiting equipment (CWE) for sending a receiving signal, detecting switchhook operation, and switching circuits, as conventionally known.

Reference numeral 7 denotes a switch box (in principle a manual switch box). The contacts of the switch box 7 have a make-before-break function. The make and common side contacts of the switch box 7 are connected through a capacitor C2 to transmit an AC signal. Reference numeral 8 denotes a network control unit; 9, a protection unit; 10, a sending/receiving section; and VDT, a videotex display terminal. The above components are connected to constitute the overall apparatus and circuit of the present invention.

The operation of the present invention will now be described. Assume that the subscriber dials a user telephone set D to call the videotex center 1 and receives an answer back signal therefrom. The subscriber then flips a switch of the switch box 7 upward (in relation to the drawing) to receive videotex information from the videotex center 1 through the network control unit 8, the protective unit 9, the transmitting/receiving unit 10, and the videotex display terminal. In this state, the telephone set D is disengaged from the main telephone line A. If a calling signal is supplied from the general calling party's telephone set C to the telephone line B while information from the videotex center 1 is being displayed on the VDT, the calling signal is supplied to the VDT as a visual mark n1 or n2, or to a speaker SP as an alarm signal, through the trunk link frame TLF, the line link frame LLF, the terminal T2, the switching unit 3, and the switch box 7.

Upon indication of the incoming call, the called party hangs up the receiver of telephone set D and simultaneously returns the switch of the switch box 7 to its original downward position. Thus, the telephone set D is re-engaged to the telephone line because of its makebefore-break configuration, and the called party momentarily operates or "flashes" the switchhook of the telephone. In this manner, a calling signal from the telephone set C allows the control unit 6, through the terminal T2, to operate the call waiting unit 5, and switching unit 3 thereby switching a contact y1-1 of the unit 5. Upon this switching, a communication path is formed through a switched contact y2-1 of the switching unit 3, so that communication between the telephone sets D and C is enabled. If the switchhook of telephone set D is momentarily operated or "flashed" to communicate with the telephone set C and then the switchhook of telephone set D is again "flashed" and changes over the switch of switch box to videotex line, the call waiting unit 5 allows communication to continue between the telephone set D, the telephone line A, and the videotex center 1. Therefore, in the present invention, when the switchhook of telephone set D is again "flashed", information from the videotex center 1 is again displayed on the VDT without there having been any inconvenience to the user.

According to the present invention, the user can always use the videotex without missing an important telephone call. If an incoming call is received, it is displayed on the videotex display terminal or brought to the notice of the user in the form of alarm signal, so that the user can switch the line to the telephone by a simple operation. The present invention is not limited to a videotex but can be used in any type of system incorporated with call waiting service for allowing effective use of a single telephone line, thus having a wide range of application in a private telephone line system.

What is claimed is:

1. A telephone call screening apparatus incorporated within a videotex system wherein a first telephone line carries a videotex data call between a videotex center and a user station and a second telephone line carries incoming telephone calls from a general calling party to the user station, comprising:

a telephone exchange providing a call waiting receiving means on the second telephone line;

switching means for selectively connecting one of a user telephone and a videotex display at said user station to said call waiting receiving means to initially receive videotex data on said first telephone line for display thereof on said videotex display, then to receive a call incoming on said second telephone line to said user telephone without terminating the videotex call and thereafter, when the user finishes talking over the user telephone, to receive again said videotex data on said first telephone line; and means for displaying at the videotex display an indication that a call is incoming on said second telephone line when said user station is connected to said first telephone line through said switching means and said call waiting receiving means.

2. In a videotex system having a videotex display, wherein a first telephone line carries a videotex data call between a videotex center and a user station and a second telephone line carries incoming telephone calls from a general calling party to a user telephone at the user station, a method of screening incoming calls on the second telephone line during reception of videotex data on the first telephone line, comprising the steps of:

providing a call waiting receiving means on the second telephone line and also providing a user controllable switching means operable to first receive said videotex data on said first telephone line for display thereof on said videotex display, then to receive an incoming call on said second telephone line to said user telephone without terminating said videotex data call and thereafter to receive again said videotex data on said first telephone line;

through the call waiting receiving means and said user controllable switching means, notifying a user of an incoming call on the second telephone line during use of the videotex system on the first telephone line; and using the user controllable switching means, connecting the user telephone at the user station to said second telephone line and said call waiting receiving means to select said incoming call without terminating the videotext call and thereafter connecting the first telephone line and the videotex system to receive and display videotex data incoming on the first telephone line.

* * * * *